United States Patent
Ivanov et al.

(10) Patent No.: US 10,139,471 B2
(45) Date of Patent: Nov. 27, 2018

(54) SUPPORTING A COLLABORATIVE COLLECTION OF DATA

(71) Applicant: HERE GLOBAL B.V., Eindhoven (NL)

(72) Inventors: Pavel Ivanov, Tampere (FI); Jari Syrjärinne, Tampere (FI); Muhammad Irshan Khan, Tampere (FI); Lauri Wirola, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/532,717

(22) PCT Filed: Dec. 22, 2014

(86) PCT No.: PCT/EP2014/078952
§ 371 (c)(1),
(2) Date: Jun. 2, 2017

(87) PCT Pub. No.: WO2016/087008
PCT Pub. Date: Jun. 9, 2016

(65) Prior Publication Data
US 2017/0371024 A1    Dec. 28, 2017

(30) Foreign Application Priority Data

Dec. 4, 2014    (WO) ................. PCT/EP2014/076519
Dec. 4, 2014    (WO) ................. PCT/EP2014/076520

(51) Int. Cl.
*H04W 4/02*    (2018.01)
*G01S 5/02*    (2010.01)
(Continued)

(52) U.S. Cl.
CPC .......... *G01S 5/0252* (2013.01); *H04L 41/145* (2013.01); *H04W 4/02* (2013.01); *H04W 64/003* (2013.01); *G06F 17/30* (2013.01)

(58) Field of Classification Search
CPC ...... G01S 5/0252; H04L 41/145; H04W 4/02; H04W 64/003; G06F 17/30
See application file for complete search history.

(56) References Cited

U.S. PATENT DOCUMENTS 8,385,943 B1    2/2013    Han et al.
8,504,288 B2    8/2013    Kadous et al.
(Continued)

FOREIGN PATENT DOCUMENTS

EP           1 227 694 A1    7/2002
WO    WO 2012/032376 A1    3/2012
(Continued)

OTHER PUBLICATIONS

International Search Report and Written Opinion for Application No. PCT/EP2014/076519, dated Sep. 3, 2015, 10 pages.
(Continued)

*Primary Examiner* — Chuong A Ngo
(74) *Attorney, Agent, or Firm* — Alston & Bird LLP

(57) ABSTRACT

An apparatus obtains fingerprints that have been collected by a plurality of mobile devices at a particular site for supporting a positioning of other mobile devices, each fingerprint comprising results of measurements on radio signals of at least one communication node at a particular location and an indication of the particular location. The apparatus generates feedback information based on the obtained fingerprints as a whole for coordinating a collection of fingerprints by the plurality of mobile devices. The apparatus transmits the feedback information to the plurality of mobile devices for presentation to users of the mobile devices.

22 Claims, 7 Drawing Sheets

(51) Int. Cl.
*H04W 64/00* (2009.01)
*H04L 12/24* (2006.01)
*G06F 17/30* (2006.01)

(56) References Cited

U.S. PATENT DOCUMENTS

| | | |
|---|---|---|
| 8,548,497 B2 | 10/2013 | Lymberopoulos et al. |
| 8,594,680 B2 | 11/2013 | Ledlie et al. |
| 2006/0089153 A1 | 4/2006 | Sheynblat |
| 2011/0039580 A1 | 2/2011 | Wigren et al. |
| 2011/0176523 A1 | 7/2011 | Huang et al. |
| 2011/0306365 A1 | 12/2011 | Wirola et al. |
| 2012/0139790 A1 | 6/2012 | Wirola et al. |
| 2012/0184219 A1 | 7/2012 | Richardson et al. |
| 2012/0225663 A1 | 9/2012 | Gupta et al. |
| 2013/0035109 A1 | 2/2013 | Tsruya et al. |
| 2013/0072216 A1 | 3/2013 | Ledlie |
| 2013/0162481 A1 | 6/2013 | Parvizi et al. |
| 2013/0210449 A1 | 8/2013 | Flanagan |
| 2013/0281111 A1* | 10/2013 | Syrjarinne ............ G01S 5/0252 455/456.1 |
| 2013/0288704 A1* | 10/2013 | Wirola ................. H04W 64/00 455/456.1 |
| 2014/0106773 A1 | 4/2014 | Li |
| 2014/0171098 A1 | 6/2014 | Marti et al. |
| 2014/0171118 A1 | 6/2014 | Marti et al. |
| 2014/0194139 A1 | 7/2014 | Yang et al. |
| 2014/0213298 A1 | 7/2014 | Marti et al. |
| 2015/0341895 A1 | 11/2015 | Zhang et al. |
| 2016/0161592 A1 | 6/2016 | Wirola et al. |

FOREIGN PATENT DOCUMENTS

| | | |
|---|---|---|
| WO | WO 2012/139250 A1 | 10/2012 |
| WO | WO 2013/065042 A1 | 5/2013 |
| WO | WO 2013/070170 A1 | 5/2013 |
| WO | WO 2013/128059 A1 | 9/2013 |
| WO | WO 2014/026338 A1 | 2/2014 |
| WO | WO 2014/065735 A1 | 5/2014 |
| WO | WO 2015/198091 A1 | 12/2015 |

OTHER PUBLICATIONS

International Preliminary Report on Patentability for Application No. PCT/EP2014/076520, dated Jun. 15, 2017, 9 pages.
International Search Report and Written Opinion for Application No. PCT/EP2014/076520, dated Jul. 27, 2015, 11 pages.
International Search Report and Written Opinion for Application No. PCT/EP2014/078952 dated Jul. 23, 2015, 10 pages.
Cisco Mobile Services Engine—Context Aware Mobility Solution Deployment Guide [online] [retrieved Dec. 19, 2014]. Retrieved via the Internet: <http://www.cisco/com/c/en/us/support/docs/wireless/mobility-services . . . > (dated Jul. 16, 2009) 52 pages.
Farid, Z. et al., *Recent Advances in Wireless Indoor Localization Techniques and System*, Journal of Computer Networks and Communications, vol. 2013, Art ID I85138 (dated 2013), 12 pages.
Nurminen, H. et al., *Statistical Path Loss Parameter Estimation and Positioning Using RSS Measurements in Indoor Wireless Networks*, 2012 IEEE, International Conference on Indoor Positioning and Indoor Navigation (Nov. 2012) 9 pages.
Tsui, A. W. et al., *Accuracy Performance Analysis Between War Driving and War Walking in Metropolitan WiFi Localization*, IEEE Transactions on Mobile Computing, vol. 9, Issue 11 (Jul. 1, 2010) 13 pages.
Wu, C. et al., *DorFin: WiFi Fingerprint-Based Localization Revisited*, [online] Retrieved from the Internet: http://arxiv.org/pdf/1308.6663.pdf. (dated Aug. 30, 2013) 10 pages.
Office Action for U.S. Appl. No. 15/531,287 dated Jan. 25, 2018, 32 pages.

* cited by examiner

SUPPORTING A COLLABORATIVE COLLECTION OF DATA

FIELD OF THE DISCLOSURE

The invention relates to the field of positioning and more specifically to supporting collaborative collection of data that can be used in positioning mobile devices.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BTLE) based positioning solutions, and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing.

Alternatively or in addition, mobile devices may be used for collecting fingerprints in a systematic manner. Collected fingerprint data may be uploaded to a database in a server or in the cloud, where algorithms may be run to generate models of WLAN access points for positioning purposes.

In the positioning stage, a mobile device may estimate its current location based on own measurements taken from the radio interface and on the data or a subset of data that is available from the training stage. Models or parts of models that have been generated in the training stage may be transferred to mobile devices for use in position determination. Alternatively, the models may be stored in a positioning server to which the mobile devices may connect to for obtaining position information.

A similar approach could be used for a positioning that is based on other types of terrestrial communication nodes or on a combination of different types of terrestrial communication nodes.

SUMMARY OF SOME EMBODIMENTS OF THE INVENTION

An example embodiment of a method according to the invention comprises, performed by at least one apparatus, obtaining fingerprints that have been collected by a plurality of mobile devices at a particular site for supporting a positioning of other mobile devices, each fingerprint comprising results of measurements on radio signals of at least one communication node at a particular location and an indication of the particular location. The method moreover comprises generating feedback information based on the obtained fingerprints as a whole for coordinating a collection of fingerprints by the plurality of mobile devices. The method moreover comprises transmitting the feedback information to the plurality of mobile devices for presentation to users of the mobile devices.

An example embodiment of a first apparatus according to the invention comprises means for performing the actions of any embodiment of the presented example method.

The means of the first apparatus may be implemented in hardware and/or software. They may comprise for instance a processor for executing computer program code for realizing the required functions, a memory storing the program code, or both. Alternatively, they may comprise for instance a circuit that is designed to realize the required functions, for instance implemented in a chipset or a chip, like an integrated circuit.

An example embodiment of a second apparatus according to the invention comprises at least one processor and at least one memory including computer program code, the at least one memory and the computer program code configured to, with the at least one processor, cause the apparatus at least to perform the actions of any embodiment of the presented example method.

Any of the described apparatuses may comprise only the indicated components or one or more additional components.

Moreover an example embodiment of a system is presented, which comprises any embodiment of any presented example apparatus and the plurality of mobile devices. Optionally, the system may further comprise various other components.

Moreover an example embodiment of a non-transitory computer readable storage medium is presented, in which computer program code is stored. The computer program code causes an apparatus to perform the actions of any embodiment of the presented example method when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for coordinating a collaborative collection of positioning data. In certain embodiment, any of the presented first apparatuses is an apparatus for coordinating a collaborative collection of positioning data.

It is to be understood that any feature presented for a particular exemplary embodiment may also be used in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
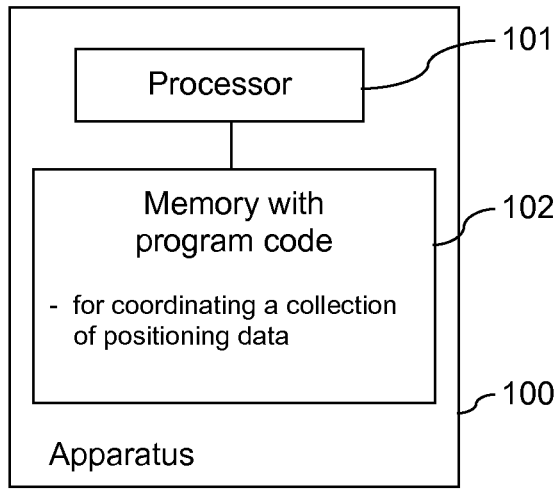
FIG. 1 is a schematic block diagram of an example embodiment of an apparatus.

FIG. 1 is a schematic block diagram of an example embodiment of an apparatus 100 according to the invention. Apparatus 100 comprises a processor 101 and, linked to processor 101, a memory 102. Memory 102 stores computer program code for coordinating a collection of positioning data. Processor 101 is configured to execute computer program code stored in memory 102 in order to cause an apparatus to perform desired actions.

Apparatus 100 could be a stationary device, like a dedicated coordination server or some other server, or a mobile device, like a mobile communication device. A stationary device is configured to be stationary when in operation. A mobile device is configured to enable operation while the device is moving. Apparatus 100 could equally be a module, like a chip, circuitry on a chip or a plug-in board, for a device. Optionally, apparatus 100 could comprise various other components, like a data interface, a user interface, a further memory, a further processor, etc.

An operation of apparatus 100 will now be described with reference to the flow chart of FIG. 2. The operation is an example embodiment of a method according to the invention. Processor 101 and the program code stored in memory 102 cause an apparatus to perform the operation when the program code is retrieved from memory 102 and executed by processor 101. The apparatus that is caused to perform the operation may be apparatus 100 or some other apparatus, for example but not necessarily a device comprising apparatus 100.

The apparatus obtains fingerprints that have been collected by a plurality of mobile devices at a particular site for supporting a positioning of other mobile devices. Each fingerprint comprises results of measurements on radio signals of at least one communication node at a particular location and an indication of the particular location. (action 201)

The apparatus furthermore generates feedback information based on the obtained fingerprints as a whole for coordinating a collection of fingerprints by the plurality of mobile devices. (action 202)

The apparatus furthermore transmits the feedback information to the plurality of mobile devices for presentation to users of the mobile devices. (action 203)

The quality of an indoor positioning which is based on collected fingerprints may depend on the coverage, density and correctness of the collected fingerprints and on the up-to-dateness of any data that may have been derived from collected fingerprints. Collecting fingerprints via crowd-sourcing may result in a large number of fingerprints; however, this may mean for some areas that more fingerprints have to be processed than needed, while other areas that are rarely visited may not be represented at all. Therefore, collecting agents may be recruited to survey particular localization sites in a systematic manner, in order to increase the coverage at these sites. Such localization sites may comprise for instance a building or some other venue that is important for a company or an association of companies. Still, even if a collecting agent moves through a site in a systematic manner, it is not possible to tell whether sufficient fingerprints are being collected at all locations of the site. For instance, more fingerprints may be needed from areas with walls than from open areas, etc. Furthermore, if the localization site is large, several collecting agents may be needed for the collection of fingerprints, since it may be difficult for a single agent to collect fingerprints for such a localization site. When several collecting agents are collecting fingerprints for a single site, it may be even more difficult to ensure that a comprehensive set of fingerprints is collected with limited efforts. Examples for large localization sites may be for instance huge shopping malls or a business center with tens of floors.

Certain embodiments of the invention provide for an aggregation of fingerprints from a plurality of mobile devices. These fingerprints may be evaluated to determine whether the fingerprints that have been collected so far as a whole can be assumed to meet requirements for supporting a positioning of other mobile devices with a desired quality. The users of the mobile devices that are used for collecting the fingerprints may be informed about the result of the evaluation.

Certain embodiments of the invention may thus have the effect that a user of a mobile device who surveys a site for collecting fingerprints in a systematic manner receives a feedback on his work and on the work of users of other mobile devices who survey the same site. This may ensure on the one hand that a group of users does not spend more time than needed for collecting fingerprints at a particular site, if the fingerprints that have been collected so far can already be assumed to enable a positioning with satisfactory quality. This may be of value, since data collection is a laborious process and after a certain point, an increasing density and number of collected fingerprints is not suited to further improve the positioning accuracy. Thus, costs for the collection of more data than needed as well as processing resources for processing more data than needed may be reduced. On the other hand, the feedback may ensure that the group of users does not stop the collection of fingerprints at a particular site, if the fingerprints that have been collected so far by the group cannot yet be assumed to enable a positioning with satisfactory quality. This may be of value, since the need for a quick supplementary survey of the site may be avoided. This may save costs for the new survey and also avoid negative user experience of other users, who are trying to determine their position based on the collected data, in the meantime. Using the collected fingerprints as a whole for providing a feedback to individual users collecting fingerprints may have the effect that the collection of several users may be coordinated efficiently.

Figure 2:
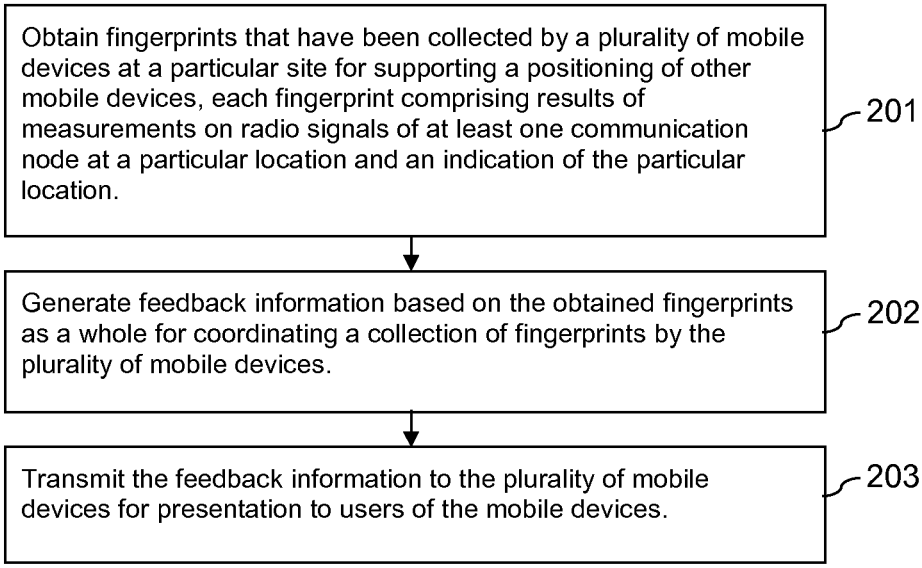
FIG. 2 is a flow chart illustrating an example embodiment of a method.

Apparatus 100 illustrated in FIG. 1 and the method illustrated in FIG. 2 may be implemented and refined in various ways.

Collected fingerprints may be used for generating radio models as an exemplary basis for determining the quality of available fingerprint data as a whole. Collected fingerprints may also be used for generating radio models that form the basis for positioning assistance data. A radio model may be defined for example by a set of measurements mapped to grid points of a grid. Alternatively, a radio model may be defined for example by the values of a finite number of parameters. While such parameters may be understood to define a general radio model, specific values of the parameters are to be understood to define a specific radio model for a specific communication node. A general radio model as well as a specific radio model may be for instance in the form of an equation or a set of equations including the parameters or the values of the parameters, respectively. If the radio model is a path loss model, the parameters may comprise for example an estimated location of the communication node. The parameters of a path loss model may further comprise for example a transmission power used by the communication node. Alternatively, the parameters may comprise a received signal strength at a predetermined reference distance to the communication node. Such a reference signal strength is also referred to as apparent transmission power. Relying on an apparent transmission power as a parameter rather than the actual transmission power may have the effect that it is easier to determine in a reliable manner based on measured values. The parameters of a path loss model may further comprise for example a path loss exponent for signals transmitted by the communication node or an average path loss of signals transmitted by the communication node. Values for a combination of a communication node location, some transmission power related parameter and some path loss related parameter may be suited to comprehensively define a radio model. It is to be understood that other parameter based radio models could be used just the same, depending on the type of communication nodes and on the measurement results that are included in the fingerprints. Alternative parameter based radio models could comprise for example a timing advance radio model or round-trip time radio model. Parameter values of a parameter based radio model may be determined directly from collected fingerprints or from measurements that have been mapped to grid points of a grid.

The feedback information that is generated and transmitted to mobile devices may relate to one or more aspects.

In an example embodiment, the feedback information relates at least to a coverage of the obtained fingerprints. This may have the effect that the users of the mobile devices may deduce at which locations fingerprints are still missing. In this case, generating feedback information may comprise assembling a list of locations for which measurements have been provided in the fingerprints. The locations may be the particular locations indicated in the fingerprints, or they could be locations represented by grid points of a grid to which the particular locations indicated in the fingerprints have been mapped. It is to be understood that a feedback relating to the coverage of obtained fingerprints could also be provided in some other form, for example a map with indicated areas that can be considered to be covered.

In an example embodiment, the feedback information relates at least to a quality of radio model data.

Radio model data for a radio model may be generated for each of a plurality of communication nodes based on the obtained fingerprints, the radio model data for each radio model comprising an estimated location of a communication node. In addition, a quality of each of the radio models may be determined. Generating feedback information may then comprise assembling a list, which includes for each of the communication nodes the estimated location of the communication node and an indication of a quality of the radio model. This may have the effect that the users of the mobile devices may deduce at which locations measurements for particular communication nodes may still be missing and at which locations measurements for particular communication nodes may be sufficient. It is to be understood that feedback information that relates to a quality of radio model data may also be provided in some other form. For example, the feedback information may indicate a general quality of all of the radio models for which radio model data has been generated based on the obtained fingerprints. Such a feedback may consist in a single value indicating a high or low general quality. This may have the effect that the users of the mobile devices may deduce in general whether or not further measurements are required, and if further measurements are required, suitable locations may be determined for example from a feedback relating to the coverage of fingerprints that have been collected so far.

A variation of this example embodiment, in which the feedback information relates at least to a quality of radio model data, comprises assigning signal strength related values for communication nodes, for which measurement results are included in the obtained fingerprints, to areas of at least one grid representing the particular site. Furthermore, an uncertainty value may be determined for each assigned signal strength related value. Furthermore, those areas may be determined, for which a ratio of a number of signal strength values assigned to a respective area with an uncertainty value falling short of a predetermined threshold to a number of all signal strength values assigned to the respective area (or to a number of communication nodes from which signals are expected to be detected in an area of the site corresponding to the respective area) falls short of a predetermined threshold. (This is to be understood to cover as well determining those areas, for which a ratio of signal strength values assigned to a respective area with an uncertainty value exceeding a predetermined threshold to all signal strength values assigned to the respective area—or to the number of communication nodes from which signals are expected to be detected in a geographical area corresponding to the respective area—exceeds a predetermined threshold.) Generating feedback information may then comprise assembling a list including at least an indication of the determined areas as areas having poor quality. This may have the effect that the users of the mobile devices may consider the areas indicated to have poor quality to require a collection of additional fingerprints. The assigned signal strength related values for a particular communication node may be detected or expected values. Thus, they may be based directly or indirectly on measurement values in obtained fingerprints. The assigned signal strength related values for a particular communication node may correspond to values in measurement results for the communication node in obtained fingerprints. Such a signal strength related value in an obtained fingerprint may be assigned to an area that corresponds to a geographical area of the site comprising the location indicated in the same fingerprint. In case there are several suitable fingerprints for the area, a mean value or median value may be used for the signal strength related value. Signal strength related values for other areas, for example for such areas for which no signal strength related value was received for a communication node, can be determined by interpolating and/or extrapolating assigned signal strength values for the communication node. Alternatively or in addition, some of the assigned signal strength related values for a communication node may be computed based on a parameter based radio model for the communication node. It may be provided that a signal strength related values for a communication node is assigned to each area of the grid, or that signal strength related values are only assigned to an area as far as exceeding a minimum value. The signal strength values for each communication nodes could be assigned to areas of a grid or a set of grids for different altitudes provided specifically for this communication node. The grid or set of grid may then be considered to be a radio model for the communication node. Alternatively, the signal strength values for all communication nodes could be assigned to areas of a single grid or a single set of grids for different altitudes. The entirety of signal strength values assigned to areas for a particular communication node may then be considered to represent a radio model for this particular communication node, or the grid or set of grids as a whole may be considered to represent a comprehensive radio model for the localization site. Uncertainty values can be assigned to the signal strength related values in different ways. For example, a first, low uncertainty value may be assigned to all signal strength related values that are based directly on measurement results in obtained fingerprints, while at least one second, higher uncertainty value may be assigned to all other signal strength related values. Alternatively, a low uncertainty value could also be assigned to signal strength related values that have been computed by interpolation in contrast to those signal strength related values that have been computed by extrapolation. Furthermore, more than two uncertainty values could be defined. Further alternatively, in case the assigned signal strength values are computed completely based on a parameter based radio model for a communication node, a higher uncertainty could be assigned to low signal strength related values than to high signal strength values, etc. Again, it is to be understood that feedback information that relates to a quality of radio model data may also be provided in some other form. For example, the feedback information may indicate a general quality of the grid areas or grid points. To this end, a proportion of areas having poor quality to all areas of the grid may be computed, wherein generating feedback information may comprise providing an indication of the computed proportion. The indication may convey the actual proportion, or simply indicate a high or low general quality.

Instead of assigning signal strength values to areas of at least one grid, it would be possible just the same to assign signal strength values to grid points of at least one grid. In this case, assigning a signal strength value that is derived directly from measurement results to a grid point may comprise mapping the location indicated in the fingerprint to the grid point representing the closest location to the indicated location and assigning the signal strength value to this grid point. Similarly, it would be possible to consider a number of communication nodes from which signals are expected to be detected in an area of the site corresponding to a respective grid point of the grid. Generating feedback information may then comprise assembling a list including at least an indication of the determined grid points as grid points having poor quality.

As indicated above, it would not only be possible to consider a ratio of a number of signal strength values assigned to a respective area or grid point with an uncertainty value falling short of a predetermined threshold to a number of all signal strength values assigned to the respective area or grid point as an indication of quality, but also a ratio of a number of signal strength values assigned to a respective area or grid point with an uncertainty value falling short of a predetermined threshold to a number of communication nodes from which signals are expected to be detected in an area of the site corresponding to the respective area or grid point. It is possible that particular signals for particular communication nodes are not assigned to an area or grid point, but that it is possible to predict or assume the number of communication nodes from which signals can be detected in an area or grid point. And if the ratio between a number of signal strength related values with low uncertainty and an expected/predicted number of communication nodes is small, the area or grid point may equally be considered an area or grid point having poor quality.

It is to be understood that there are many other possibilities for determining a quality of radio model data. For example, it would also be possible to assign—for communication nodes, for which measurement results are included in obtained fingerprints—signal strength related values to areas or grid points of at least one grid representing the particular site, determining for each assigned signal strength related value an uncertainty value, and determining an average of all uncertainties over all areas or grid points and all communication nodes. Generating feedback information may then comprise providing an indication of a general quality based on the determined average.

Depending on the radio model, the generated radio model data may comprise or consist of parameter values.

Parameter values of a radio model comprising the estimated location of a communication node could be estimated for instance using an iterative least squares method for solving non-linear problems, like the Gauss-Newton method. The computations for minimizing a function using this method include a computation of an approximation of a covariance matrix, which indicates the uncertainty of each parameter value. Thus, estimating parameters values of a radio model and determining the uncertainty of the parameter values defining the radio model may be a single action in certain embodiments. The uncertainty of at least one parameter value of a radio model may be an indication of the quality of the radio model. If the uncertainty of values of a plurality of parameters is considered, the quality of the radio model may be determined to be high, if the uncertainty of each of the values of the plurality of the parameters lies below a predetermined threshold for the respective parameter. This may have the effect that the quality is easy to determine and significant. It is to be understood that the quality of the radio model could be determined in other ways as well.

In an example embodiment, a particular mobile device receives feedback information that includes a list of estimated locations of communication nodes and an associated indication of a quality of a radio model. The particular mobile device may then present a map with an indication of the estimated locations and the associated quality of a radio model to a user. Alternatively or in addition, the particular mobile device may compute a proportion of radio models with associated indication of high quality to all radio models and present an indication of the proportion to a user as indicator of data sufficiency. The indication may be for instance a value of the proportion, or an indication 'high quality' or 'low quality', or an indication 'collected data sufficient' or 'collected data not sufficient', etc.

In an example variation, a particular mobile device may receive feedback information that includes a list including at least an indication of areas or grid points with poor radio model data quality. The particular mobile device may then present a map with at least an indication of the areas or the grid points with poor radio model data quality. This may have the effect that the user is informed in which areas or in the environment of which grid points further fingerprints should be collected. It would also be possible to indicate different areas or different grid points with different radio model data quality differently. In certain embodiments, the particular mobile device may present a feedback about a quality of radio models in different areas or at different grid points by displaying an indoor map and by coloring the areas or the grid points indicated to have 'poor' radio model data quality with a first color, e.g. red, and all other areas or grid points with a different color, e.g. green. In case indications of areas or grid points with different levels of radio model data quality are received, e.g. 'poor', 'satisfactory' and 'good', the corresponding areas or grid points could also be displayed with different colors, e.g. red, yellow and green, respectively. Alternatively or in addition, the particular mobile device may compute a proportion of areas or grid points with poor radio model data quality to all areas or grid points of the at least one grid and present an indication of the proportion to a user as an indicator of data sufficiency. This may have the effect that if the proportion is low, a user may know that it is not necessary to collect further fingerprints, and otherwise, that it is still necessary to collect further fingerprints at the site.

In an example embodiment, the feedback information relates at least to a validity of the obtained fingerprints. Measurement results in different fingerprints that have been obtained for a comparable location may be compared, and fingerprints including different measurement results for a comparable location may be marked as suspicious. Generating feedback information may then comprise assembling a list of fingerprints that have been marked to be suspicious. This may have the effect that the correctness of fingerprint data and/or the consistency of the data of several fingerprints can be checked. It is to be understood that a feedback relating to a validity of obtained fingerprints could also be obtained in some other way. It may be determined in various ways whether locations are comparable. For example, locations may be comparable if they are mapped to the same grid points of a grid when generating radio model data. For example, locations may be comparable if their distance falls short of a predetermined threshold in meters and/or a predetermined threshold in numbers of floors. It is further to be understood that measurement results for a comparable location may be considered to be different with respect to various aspects. Different measurement results may be assumed to be given for example, if a difference between signal strength values for the same communication node exceeds a predetermined threshold for different fingerprints for a comparable location. Alternatively or in addition, different measurement results may be assumed to be given for example, if signal strength values for different sets of communication nodes are present in different fingerprints for a comparable location.

In an example embodiment, a particular mobile device may receive feedback information that includes a list of fingerprints that have been marked to be suspicious, filter fingerprints that have been collected by the particular device, present the list to a user, request an input from the user whether the fingerprint should be considered correct or incorrect, and transmit a corresponding indication to the apparatus. Such an interactive evaluation of the validity of fingerprints may be suited to provide a particularly reliable result. Certain fingerprints that are marked to be suspicious could only be discarded, for example, if a problem with the fingerprint is confirmed by the user of the device that provided the fingerprint. It is to be understood, however, that alternatively fingerprints that are determined to be suspicious could be discarded right away without input from the user of the mobile device that collected the fingerprint.

In an example embodiment, the obtained fingerprints are currently obtained fingerprints and the feedback information relates to a relevance of data that has been generated and stored based on previously obtained fingerprints. This may have the effect that the up-to-dateness of the old data may be verified and that the old data may be updated, if needed. This may be considered to be a coordination of a collection of fingerprints over time.

There are several possibilities for generating feedback information that relates to a relevance of data that has been generated and stored based on previously obtained fingerprints, which may optionally be used in combination as well.

For a first example possibility, a location of a communication node may be estimated based on the currently obtained fingerprints, a distance may be determined between the estimated location and a location that has been estimated for the communication node based on the previously obtained fingerprints, and it may be decided whether to mark the communication node as suspicions for changed location based on the determined distance. Generating feedback information may then comprise assembling a list of communication nodes that have been marked to be suspicious for changed location. This may have the effect that possibly relocated communication nodes may be identified. The considered location that has been estimated for the communication node based on the previously obtained fingerprints may be readily available in previously generated and stored data, or it may be newly estimated based on stored, previously obtained fingerprint data, or it may be newly estimated based on stored grid data that was previously generated by mapping the previously obtained fingerprint data to grid points of a grid.

For a second example possibility, it may be determined whether a coverage of currently obtained fingerprints intersects with a coverage of a communication node that is estimated based on previously obtained fingerprints, while currently obtained fingerprints do not comprise measurement results on signals transmitted by the communication node. If this is the case, the communication node may be marked as suspicious for being removed. Generating feedback information may then comprise assembling a list of communication nodes that have been marked to be suspicious for being removed. This may have the effect that possibly relocated communication nodes may be identified. The coverage of the communication node may be readily available in previously generated and stored parameter based radio model data, or it may be newly determined based on stored, previously obtained fingerprint data, or it may be newly determined based on stored grid data that was previously generated by mapping the previously obtained fingerprint data to grid points of a grid.

In an example embodiment, a particular mobile device may receive feedback information that includes a list of communication nodes that have been marked to be suspicious for one of change of location and being removed. The list may be presented to a user of the particular mobile device. In addition, an input may be requested from the user whether data on the marked communication node that was generated from previously obtained fingerprints should be removed. An indication corresponding to the user input may be transmitted to the apparatus. This may have the effect that users of the collecting mobile devices may be involved in obtaining particularly reliable decisions.

An example embodiment comprises receiving from at least one of the plurality of mobile devices an indication on a state of completion of a collection of fingerprints at the particular site. The indication may be used for instance as a basis for deciding whether to generate final positioning assistance data for supporting a positioning of mobile devices at the particular site or whether to wait to this end for further fingerprints collected at the site. This may have the effect that final positioning assistance data may only be computed when it has been ensured that no further fingerprints for the site are to be expected in the near future. Any of the plurality of mobile devices may request its user to input an indication of a state of completion of a collection of fingerprints at the particular site, for example in response to feedback information provided by the at least one apparatus and presented to the user. The indication may be transmitted to an apparatus obtaining collected fingerprints from the plurality of mobile devices, or it may be used within the mobile device, in case this mobile device is an apparatus obtaining collected fingerprints from a plurality of mobile devices. The indication may be requested from a user for instance whenever the user terminates an application that supports the collection (and transmission) of fingerprints.

In an example embodiment, the at least one communication node comprises at least one terrestrial communication node, since satellite signals may be less suited for indoor positioning. In an example embodiment, the at least one communication node comprises at least one non-cellular terrestrial communication node. The at least one non-cellular terrestrial communication node could comprise any non-cellular ground based communication node that is configured to transmit radio signals. In an example embodiment, it comprises at least one wireless local area network access point and/or at least one Bluetooth transmitter and/or at least one BTLE transmitter. It is to be understood that a Bluetooth transmitter and a BTLE transmitter could optionally be a part of a respective transceiver. WLAN and Bluetooth communication nodes are already installed in many buildings. Furthermore, WLAN and Bluetooth technologies are already supported in many mobile user devices, like smartphones, tablets, laptops and in the majority of feature phones. Using WLAN access points, Bluetooth transmitters and/or BTLE transmitters as communication nodes may thus have the effect that the supported positioning can be based on an existing infrastructure in buildings and on existing capabilities in mobile devices. As a result, the approach may be globally scalable and have low maintenance and deployment costs. The deployment of new infrastructure, including for example beacons and tags, is not necessary. In addition, the end-user experience may be acceptable with these technologies, since a horizontal positioning accuracy of 2-3 meters as well as close to 100% reliability in floor detection may be achieved. It is to be understood that the at least one communication node could also comprise at least one cellular transmitter, like a base station of a cellular communication network. However, due to the narrow frequency bands of cellular signals, WLAN and Bluetooth nodes may generally enable a more accurate positioning. Furthermore, communication nodes transmitting any other kind of wireless signals, including for instance ultra-wideband (UWB) signals or any wireless signals that might emerge in the future, may be used as well. The communication nodes do not even have to be ground-based necessarily. For example, the communication nodes could also comprise communication nodes in a ship.

If the communication node is a WLAN access point, for example, the results of the measurements included in a fingerprint may contain for instance a basic service set identification (BSSID), like the medium access control (MAC) address of observed access points (APs), the service set identifier (SSID) of the access points, and the signal strength of received signals (received signal strength indication RSSI or physical Rx level in dBm with a reference value of 1 mW, etc.). If the communication node is a transmitter of a cellular communication network, for example, the results of the measurements may contain for instance a global and/or local identification of the cellular network cells observed, their signal strengths and/or path losses and/or timing measurements like timing advance (TA) or round-trip time. If the communication node is of a further type, the results of the measurements included in a fingerprint may contain for example similar data.

In an example embodiment, the apparatus providing the feedback is or belongs to one of the plurality of mobile devices which collect the fingerprints. This may have the effect that the mobile devices may operate independently of a stationary server with respect to the collection of fingerprints. This means that the mobile device does not necessarily have to rely on a connectivity to a server—for example via a cellular communication network—at any location at which information on the sufficiency of collected fingerprints may be desired. In an alternative example embodiment, the apparatus determining the radio model quality is or belongs to a server that is configured to receive and process fingerprints from a plurality of mobile devices. This may have the effect that processing resources of the mobile devices are saved.

Figure 3:
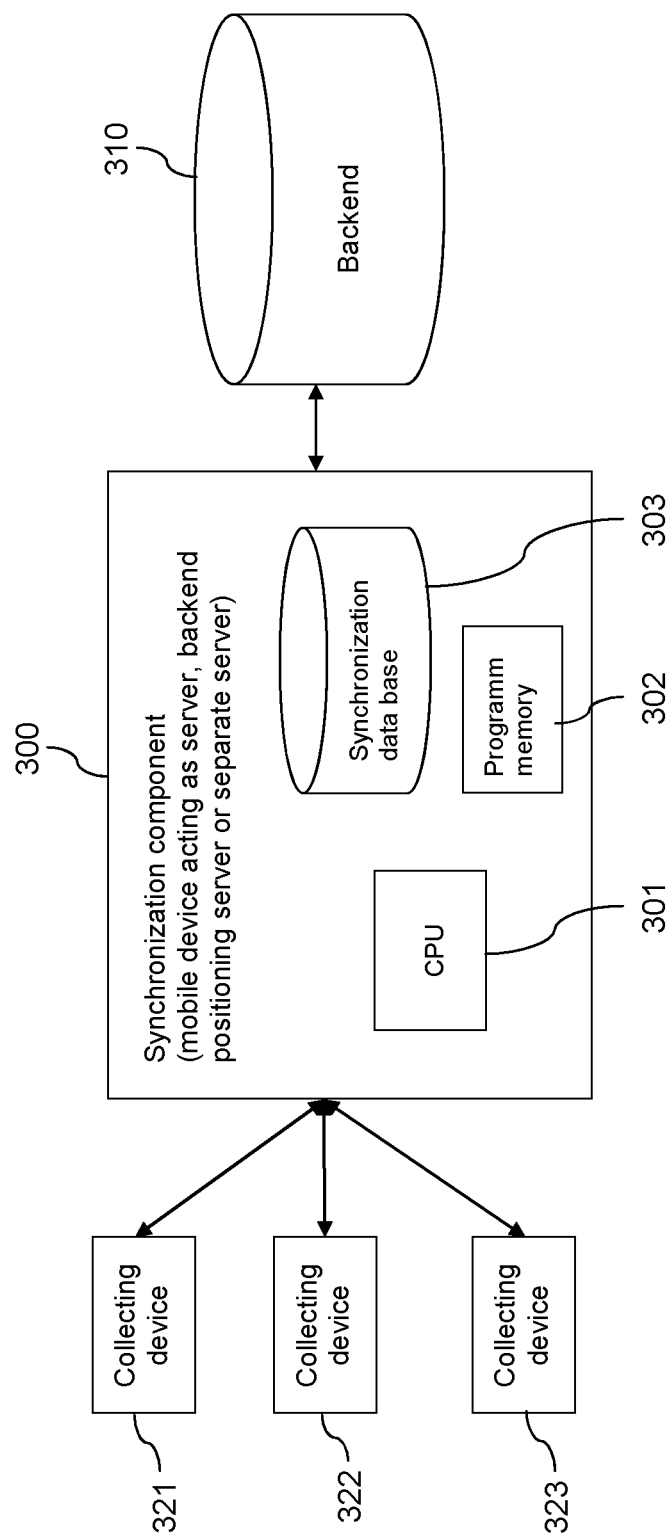
FIG. 3 is a first schematic block diagram of an example embodiment of a system.

FIG. 3 is a schematic block diagram of an example embodiment of a system according to the invention. The system may support a coordinated collection of fingerprints by a plurality of mobile collecting devices at a particular localization site.

The system comprises a synchronization component 300, a backend 310 and a plurality of mobile collecting devices 321, 322, 323.

Synchronization component 300 comprises for example a central processing unit (CPU) 301, a program memory 302 and a synchronization data base 303. Synchronization component 300 is configured to receive fingerprint data from a plurality of collecting devices 321 to 323, to aggregate and process the fingerprints for obtaining radio model data, to retrieve previously stored radio model data from backend 310 for verification, to generate feedback information for collecting devices 321 to 323, and to cause storage of final radio model data for a localization site at backend 310. To this end, corresponding computer program code may be stored in program memory 302 for execution by CPU 301. Synchronization data base 303 may be configured to store any data that is required for the processing, until final radio model data for a localization site can be stored at backend 310.

Synchronization component 300 could be an example embodiment of an apparatus according to the invention.

Backend 310 may be configured to store final radio model data for communication nodes for a large number of localization sites. It may comprise for example essentially a memory that may be accessed by synchronization component 300 and possibly other entities. Alternatively, it may comprise for example a memory and a positioning server. In this case, backend 310 may be configured in addition to provide radio model data to requesting mobile devices as positioning assistance data and/or to perform positioning computations for positioning mobile devices upon request.

Collecting devices 321 to 323 may be for instance mobile terminals, like regular smartphones, or dedicated surveying devices. Collecting devices 321 to 323 are configured to collect fingerprints including results of measurement on signals of communication nodes and to communicate with synchronization component 300.

While synchronization component 300 is presented as a separate component that is able to communicate with collecting devices 321 to 323 on the one hand and with backend 310 on the other end, it may also correspond to or belong to the backend, or correspond to or belong to a mobile device, for example, though not necessarily to one of collecting devices 321 to 323. In the latter case, the received and processed fingerprints comprise the fingerprints that have been collected by the mobile device itself.

Figure 4:
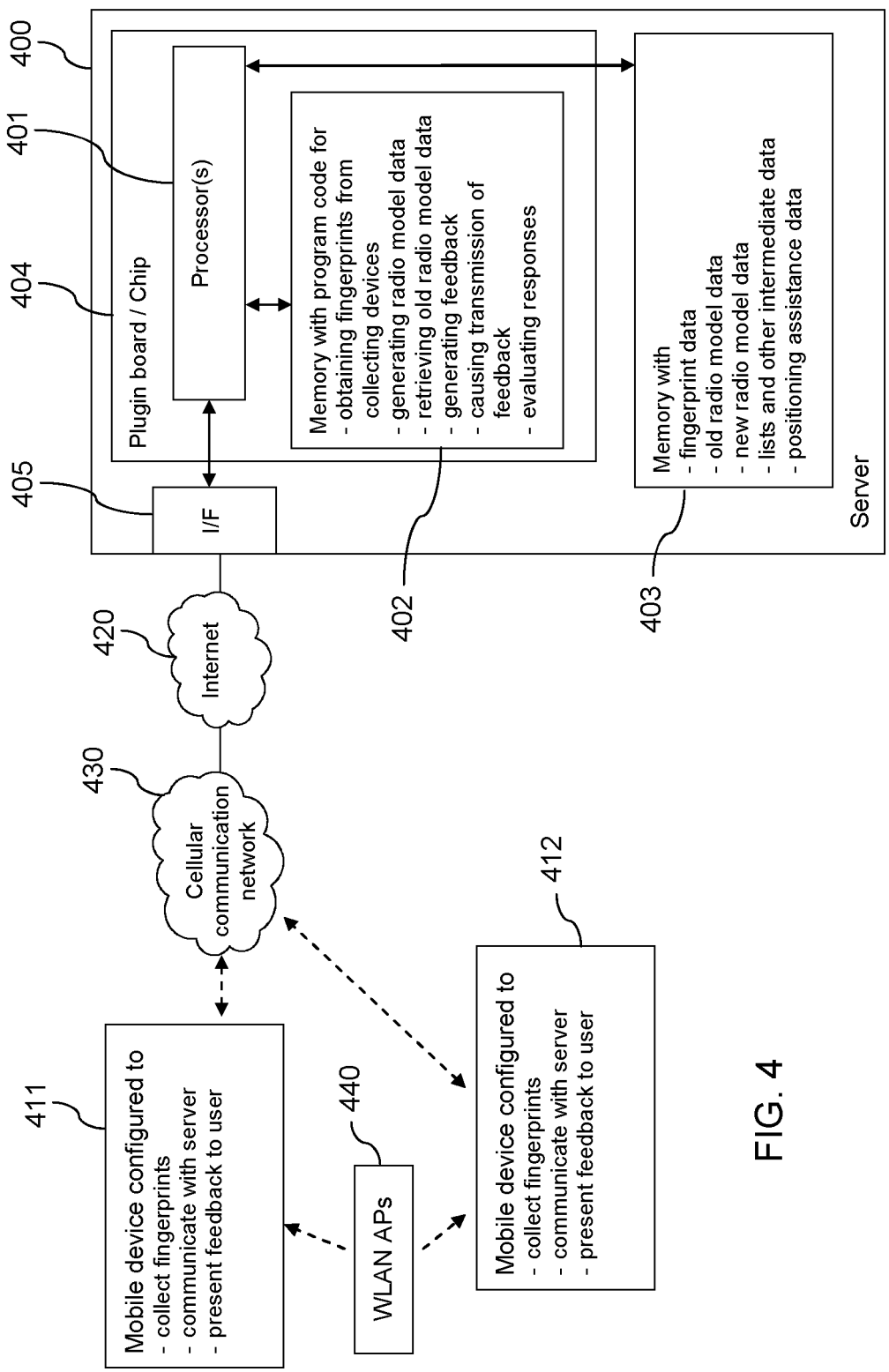
FIG. 4 is a second schematic block diagram of an example embodiment of a system.

FIG. 4 is a schematic block diagram of a second example embodiment of a system according to the invention. It may be considered to represent an exemplary implementation of the system of FIG. 3. In this case, the system may coordinate the collection of fingerprints at a server.

The system comprises a server 400 and a plurality of mobile devices 411, 412. The system further comprises a network 420, by way of example the Internet. The system further comprises a cellular communication network 430 that is connected to the Internet 420. The system further comprises a number of WLAN access points (AP) 440.

Server 400 may be for instance a server that is provided specifically for coordinating the collection of fingerprints, or it could be a server which receives fingerprints for generating and updating data for a large positioning database, or it could be any other server. Server 400 comprises a processor 401 that is linked to a first memory 402, to a second memory 403 and to an interface (I/F) 405.

Processor 401 is configured to execute computer program code, including computer program code stored in memory 402, in order to cause server 400 to perform desired actions.

Memory 402 stores computer program code for receiving fingerprints from collecting devices and for aggregating fingerprint data, computer program code for generating new radio model data, computer program code for retrieving old radio model data, program code for generating feedback information, program code for causing transmission of feedback information to mobile devices 411, 412 for presentation to users of mobile devices 411, 412, and program code for evaluating responses to the feedback information. Some of the program code may be similar to the program code stored in memory 102. In addition, memory 402 could store computer program code configured to realize other functions, for instance program code for providing positioning assistance data to mobile devices upon request and/or for performing positioning computations for mobile devices upon request. In addition, memory 402 could also store other kind of data.

Processor 401 and memory 402 may optionally belong to a plug-in board or a chip with an integrated circuit 404, which may comprise in addition various other components, for instance a further processor or memory.

Memory 403 is configured to store data, including for example data of received fingerprints, old radio model data, new radio model data, and other intermediate data like lists of locations, lists of fingerprints, lists of access points, etc. In addition, it could be configured to store any other data, like positioning assistance data.

It is to be understood that the data of memory 403 could also be distributed to several memories, which may be partly or completely external to server 400. For example, all data that is used for coordinating the collection of fingerprints for a particular localization site could be stored internal to server 400, and final positioning assistance data could be stored at an external memory that is accessible via a separate positioning server. In this case, memory 403 could basically correspond to synchronization data base 303 of FIG. 3.

Interface 405 is a component which enables server 400 to communicate with other devices, like mobile device 411 and 412, via networks 420 and 430. It could also enable server 400 to communicate with other entities, like other servers. Interface 405 could comprise for instance a TCP/IP socket.

It is to be understood that server 400 could comprise various other components.

Component 404 or server 400 could be an example embodiment of an apparatus according to the invention.

Sever 400 may correspond to synchronization component 300 of FIG. 3.

Mobile devices 411, 412 may be for instance mobile terminals, like regular smartphones or dedicated surveying devices. They are configured to collect fingerprints, to communicate with server 400 and to present information to a user via display means. Mobile devices 411, 412 may correspond to collecting devices 321 to 323 of FIG. 3.

Cellular communication network 430 could be any kind of cellular communication network, like a Global System for Mobile Communications (GSM), a CDMA2000, a Universal Mobile Telecommunications System (UMTS), or a long term evolution (LTE) based communication network.

The WLAN access points (AP) 440 could be access points of one or more WLANs. The WLAN or WLANs may but do not have to be connected to the Internet 420. The WLAN access points 340 may be example communication nodes mentioned with reference to FIG. 3.

Example operations in the system of FIG. 4 will now be described with reference to the flow charts of FIGS. 5 and 6.

Processor 401 and some of the program code stored in memory 402 may cause server 400 of FIG. 4 to perform the actions presented on the left hand side when the program code is retrieved from memory 402 and executed by processor 401. Similar operations could be performed by a separate synchronization component as shown in FIG. 3 or by a collecting device 321 of FIG. 3 acting as a synchronization component. Mobile devices 411, 412 are caused to perform the actions presented on the right hand side. Collecting devices 321 to 323 of FIG. 3 could be caused to perform the same actions.

When a localization site is to be surveyed to collect data for a WLAN based positioning at the site, a synchronization is initialized and assigned to the collection process for the particular site. (action 501) The localization site may be for instance a large building. It is to be understood that a synchronization could be initialized for a collection process for several sites in parallel. If the localization site is surveyed for the first time, some initialization values that may be defined may be set to default values.

A plurality of collecting agents are requested to collect fingerprints at the particular localization site. (action 511) Each collecting agent may activate an application of a mobile device 411, 412 for automatically collecting fingerprints while he is moving through the site. As a result, a GNSS receiver of mobile device 411, 412 may capture satellite signals and estimates the location of mobile device 411, 412 at regular intervals, for example once per second, using assistance data that is provided by some GNSS assistance server via cellular communication network 430. A WLAN component of mobile device 411, 412 detects radio signals from WLAN access points 440 in the environment and performs radio measurements on these signals at the same regular intervals. The results of the measurements contain an identifier (ID) of each observed access points, like a BSSID, and a received signal strength (RSS) value indicating the strength of the signals that have been detected at the location of measurement in dBm for the observed access points. Fingerprints are assembled to comprise a location that has been determined at a particular time and results of measurements for one or more WLAN access points 440 that have been obtained basically at the same time. It has to be noted that it is also possible that a collecting agent inputs the locations for the fingerprints manually, e.g. using indoor map of the building.

The location in an assembled fingerprint may have only a horizontal component, for instance a longitude value and a latitude value, or easting and northing values. Alternatively, it could also have an altitude component. Considering an altitude value may be of particular interest for indoor positioning. In outdoor positioning it is often enough to achieve horizontal position estimates using a two-dimensional map, whereas indoors, especially in tall buildings, it may be of interest to have a capability to estimate the floor on which a person is located as well. Including an altitude component in the fingerprints may allow determining the floor of a building in which a mobile device and thus a person using the device is located. The altitude value can indicate for example an absolute altitude, a relative altitude compared to the altitude of the ground floor of a building or a floor number. The altitude component for a fingerprint may be determined in a different manner than the horizontal location, for instance using a calibrated barometer, an uncalibrated barometer or an input of a user indicating the floor on which fingerprints are to be collected.

Mobile device 411, 412 transmits the collected fingerprints to server 400, for instance upon indication of the collecting agent that a first survey of the localization site has been completed, or on a regular basis or continuously during the ongoing survey.

Sever 400 obtains fingerprints from a plurality of mobile devices 411, 412. (action 502)

Sever 400 aggregates a certain amount of fingerprint data as a basis for further processing. The aggregation may take place for instance over a predetermined period of time or until a predetermined number of new fingerprints has been obtained. (action 503) The aggregation may comprise a common storage of all fingerprint data in memory 403. The aggregation may further comprise a mapping of the results of measurements in the fingerprints to grid points of one or more grids. A grid could be defined for each floor of the surveyed localization site. Each grid could be a uniformly spaced rectangular two-dimensional grid representing a geographical area that includes the area of one of the floors of the localization area. Each grid could have for instance a grid step of 3 meters in each direction. Any other grid step could be used as well. The measurement results in each of the fingerprints could then be mapped to a grid point of the grids that is provided for one of the floors. Each grid point could represent a particular geographic location of the surveyed localization site and possibly of some surrounding area. The correct floor and thus the correct grid could be determined based on an altitude component in the location that is indicated in the respective fingerprint and on knowledge about the floor height in a building. Instead of using a separate two-dimensional grid for each floor, it would also be possible to use a cuboid three-dimensional grid for an entire multi-level building. The grid point to which the measurement results of a particular fingerprint are mapped could be the grid point that corresponds to a real location that is closest to the horizontal location indicated in the fingerprint. If the measurement results for the same WLAN access point from several fingerprints would be mapped to the same grid point, an average value of the received signal strength (RSS) could be used, for example. The result can be considered to be a radio map, as an exemplary first kind of radio model, which indicates for various locations corresponding to a grid point an expected RSS value for one or more WLAN access points. An indication of the number of considered fingerprints could be associated with each grid point. The grid data could be stored alternatively or in addition in memory 403.

From the aggregated fingerprint data, server 400 generates a list of locations, for which RSS values have been obtained in the fingerprints. (action 504) Each location may be identified for instance by a site ID, by a floor ID and by Latitude and Longitude values. The Latitude and Longitude values indicated in the list may correspond to the locations indicated in the fingerprints. Alternatively, they could correspond to coordinates of those grid points of a grid of a particular floor of the localization site, to which results of measurements have been mapped. The location list may be stored in memory 403. Server 400 transmits the location list to all mobile devices 411, 412 that are currently used for surveying the localization site.

Each of the mobile devices 411, 412 receives the location list. Each of the mobile devices 411, 412 presents a map, in which the listed locations are highlighted, on a display of the mobile device 411, 412 to the user of the mobile device 411, 412. (action 512) The presented map may include for example the outlines of a floor, possibly with an indication of inner walls, open spaces—as in the case of stair cases or elevators —, etc. The highlighted locations indicate to the users at which locations of the localization site fingerprints have already been collected and from which locations of the localization site fingerprints are still missing. Thus, they constitute a guidance to the user for the collection of additional fingerprints. Since the list is based on collected fingerprints of all mobile devices 411, 412 surveying the site, a user may also refrain from collecting fingerprints at locations that have already been covered by users of other mobile devices 411, 412.

Server 400 now generates radio model data for each WLAN access point for which suitable RSS values are available by estimating the values of parameters defining the radio model. (action 505) Server 400 also determines the uncertainties of the estimated parameter values. The estimated parameter values and the associated uncertainties may be stored in memory 403 as radio model data. The radio model may be any kind of model that is defined by values of a limited set of parameters and that enables an estimation of a position of other mobile devices based on RSS measurements performed by the other mobile devices. By way of example, it is assumed that the radio model is a path loss model, which is defined by an estimation of the location of the WLAN access point, an estimation of an apparent transmission power used by the WLAN access point for transmitting signals and an estimated path loss exponent. The parameter values for each radio model could be estimated for example using a standard radio signal propagation model and the Gauss-Newton algorithm for a non-linear fitting problem.

An example approach for the estimation of parameter values of a radio model based on measurement results has been described by H. Nurminen, J. Talvitie, S. Ali-Löytty, P. Müller, E.-S. Lohan, R. Piché and M. Renfors in "Statistical Path Loss Parameter Estimation and Positioning Using RSS Measurements in Indoor Wireless Networks", 2012 IEEE, International Conference on Indoor Positioning and Indoor Navigation, 13-15 Nov. 2012. WLAN access point position, apparent transmission power and path loss exponent are estimated in this approach using an iterative reweighted least squares method (Gauss-Newton method). The considered apparent transmission power is the received signal power at a distance of 1 meter to the WLAN access point position. An initial value for the access point position may be set to the location at which the highest RSS value has been measured according to the mapped RSS values. The Bayesian Gauss-Newton algorithm presented in this document also returns an approximation for the covariance matrix of each quantity. Thus, the estimation of the parameter values of each radio model already comprises an estimation of uncertainties of the parameter values.

Server 400 also estimates the quality of each radio model based on the determined uncertainties of the estimated parameters values. The quality of a radio model may be determined to be either high or low. The quality of a radio model may be determined to be high, if the uncertainty for each parameter value—that is, the uncertainty of the estimated location of the access point, the uncertainty of the estimated apparent transmission power and the uncertainty of the estimated path loss exponent—falls short of a threshold predetermined for the respective parameter. If the uncertainty for at least one of the parameter values exceeds the threshold defined for the parameter, in contrast, the quality of a radio model may be determined to be low. It is to be understood that alternatively, more than two quality levels could be defined.

Server 400 now assembles a quality list with estimated locations of access points and the quality of the radio model for which parameter values have been determined for the respective access point. The quality list may be stored in memory 403.

Server 400 transmits the quality list to all mobile devices 411, 412 that are currently used for surveying the localization site.

Each of the mobile devices 411, 412 receives the quality list. Each mobile device 411, 412 presents a map, in which the listed locations of access points and the associated quality of the radio models are indicated, on a display of mobile device 411, 412 to the user of mobile device 411, 412. (action 513) The map may be a guidance to the user, as the user may assume that further fingerprints should be collected in the environments of access points for which a radio model of low quality has been generated.

In addition, each mobile device 411, 412 may determine the general quality of the set of radio models for which parameter values have been determined for a currently surveyed localization area. (action 514) It is to be understood that the general quality could also be determined by server 400 and indicated to each of mobile devices 411, 412. If the quality of the set of radio models in general is high, it may be acceptable if the quality of some individual radio model or models is low, and a further collection of fingerprints may be stopped. The general quality of the set of radio models may be estimated for example by determining the proportion of the number of radio models that have been determined to have a high quality to the total number of access points that have been detected at a particular localization site. If the proportion reaches or exceeds a predetermined threshold, for example 75%, this may indicate that the general quality of the set of radio models is sufficiently high. If the proportion falls short of the predetermined threshold, this may indicate that additional data may have to be collected for obtaining an acceptable general quality of the set of radio models. It is to be understood that any other threshold could be selected as well.

Figure 5:
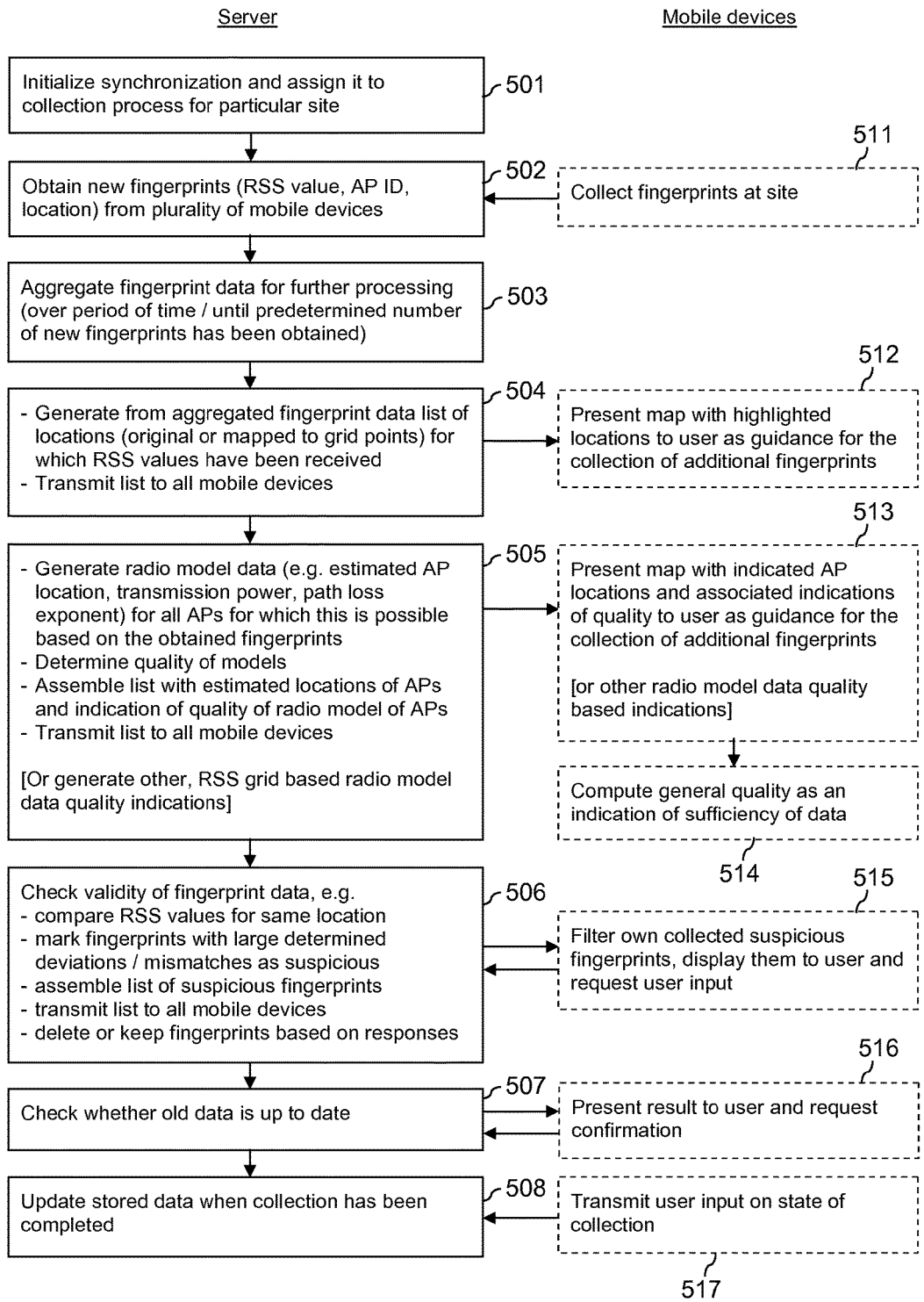
FIG. 5 is a flow chart illustrating an example embodiment of operations in the system of FIG. 4.

The quality of radio model data can also be determined and used in other ways, as briefly indicated in actions 505 and 513 of FIG. 5.

For example, another kind of radio model than a parametric radio model may be in the form of an RSS grid, with grid points or grid areas corresponding to different locations and with grid values assigned to the grid points or grid areas being RSS values for a particular access point. Server 400 may create such RSS grid values for an access point for example directly based on measurements from fingerprints, based on an estimated path loss model, and using interpolation and extrapolation methods. For example, if measured RSS values from fingerprints are assigned as grid values to some of the grid points, values of remaining empty grid points that are inside a convex hull of those grid points with measured RSS values can be interpolated, e.g. using an Inverse Distance Weighting interpolation, while remaining empty grid points outside the convex hull can be extrapolated using a path loss model, or the minimum RSS value from the fingerprints for a particular access point. In addition, it is possible to define an uncertainty value for each RSS value that has been assigned to a grid point. Just to provide one example, a predefined uncertainty value $\sigma_1$ may be assigned to all interpolated RSS values and to all RSS values from fingerprints, while a predefined second uncertainty value $\sigma_2$ may be assigned to all extrapolated RSS values. It is to be understood, however, that alternative more sophisticated approaches to determine uncertainties can be used.

If a radio model for an access point comprises an RSS grid and an uncertainty value for different grid points, or grid areas, depending on uncertainties of the RSS values that have been assigned to the respective grid point or grid area, server 400 may determine an overall quality of the radio model for a particular access point. The overall quality may correspond for example to the average RSS uncertainty of the radio model. Alternatively, the quality of the radio model data can be evaluated separately for different grid points or different grid areas, since the radio model can have different uncertainty values for different grid points or grid areas.

Additionally, server 400 may indicate grid points or grid areas for which the overall quality of all detected (or expected to be detected) access points is poor. An area (or an associated grid point) can be indicated as having poor quality and requiring additional fingerprints, if the number of access points, for which an RSS value has been reliably estimated for the area or the grid point (i.e. for which the RSS uncertainty is below a predetermined threshold), is considerably smaller than the total number of access points detected or expected to be detected in the grid area or in the environment of a grid point. The number of access points detected in the given grid area (or mapped to a given grid point) can be defined based on the number of access points in the fingerprints indicating a location corresponding to the area (or mapped to the grid point). The number of access points expected to be detected in the areas (or at the grid points) without fingerprints can be determined based on the number of access points in the areas with fingerprints and interpolation methods, e.g. using Inverse Distance Weighting interpolation, or Nearest Natural neighbor interpolation.

Mobile devices 411, 412 receiving an indication of the overall quality of grid points or grid areas may present a map to a user on a display and highlight the grid areas or grid points with low overall quality to indicate to the user that additional collection of fingerprints is required at these locations.

Server 400 or the mobile devices 411, 412 could also determine a general quality of the RSS grid based radio models for all considered access points. The general quality of the radio models may indicate a percentage of grid areas or grid points with good overall quality. Such a percentage may indicate when data collection can be stopped. Alternatively, the general quality of the radio models may be determined as an average of the uncertainty over all grid areas or grid points and all access points. If this average falls short of a predetermined threshold, this may also indicate that the data collection can be stopped.

Server 400 furthermore checks the validity of the data in the obtained fingerprints. (action 506) By validity, correctness and consistency of the locations indicated in the fingerprints is meant in this embodiment. The location indicated in a fingerprint may be wrong, for example, if received GNSS signals were too weak for determining a correct up-to-date location or if the user indicated a wrong location. Checking the validity may be realized by comparing the results of radio measurements in different fingerprints that are provided for the same location. It is possible to compare the available RSS values for the same access point at the same location in different fingerprints. Different devices measuring signals from the same access point at the same location should measure the same signal strength. Alternatively or in addition, server 400 may determine whether different sets of access points are represented in different fingerprints that have been provided for the same location. Different devices should observe basically the same set of access points at the same location, at least as far as the signals from these access points have a certain signal strength. Differences between measurement results can be calculated for instance by using conventional Euclidean Norms, and if the value of the Norm exceeds a certain threshold, the measurement results are considered different. If there is a significant deviation, it can be assumed that the location in at least one of the considered fingerprints is not correct, and these fingerprints could be marked as being suspicious. Server 400 assembles a further list with an indication of suspicious fingerprints. The fingerprint list may be stored in memory 403. Server 400 transmits the fingerprint list to all mobile devices 411, 412 that are currently used for surveying the localization site.

Each of the mobile devices 411, 412 receives the fingerprint list. Each mobile device 411, 412 filters the list to obtain an indication of those suspicious fingerprints that were collected by this mobile device 411, 412. (action 515) Information on the filtered suspicious fingerprints may be presented on a display of mobile device 411, 412 to the user of mobile device 411, 412. The user may be requested to confirm that the fingerprint location of a respective suspicious fingerprint is incorrect or confirm that the fingerprint location is correct. The indication may be sent back to server 400.

In the case of a confirmation that the location is incorrect, server 400 deletes the fingerprint data. Otherwise, server 400 keeps the fingerprint data for further use.

The process of actions 502 to 506 may continue in an iterative process, until mobile devices 411, 412 or the users of mobile devices 411, 412 and/or server 400 come to the conclusion that no further improvement can be achieved.

Once this is the case, server 400 checks in addition whether previously stored data that is based on previously collected fingerprints is still up-to-date. (action 507) Previously stored data for the particular site may be retrieved from a memory. In particular in case the data is stored in an external memory, the data could be retrieved for example in the scope of the initialization in action 501 and stored in memory 403. When new fingerprints are collected for the localization site, this does not necessarily mean that all previously stored data has to be discarded. However, even if this previously stored data was of high quality when generated, the radio environment may have changed in the meantime so that at least some of the data may be out of date. For example, if according to previously stored data that is based on fingerprints collected several months ago, a WLAN access point A has coordinates (X1, Y1, Z1), but according to newly collected fingerprints, the same access point has other coordinates (X2, Y2, Z2) or has not been detected at all anymore, the old data for this access point A may be considered as expired so that it can be removed. On the other hand, if there is no evidence that old and new data are inconsistent, than the old data can be considered to be still relevant and there is no need to remove it.

Example operations for checking previously stored data will be explained with reference to FIG. 6.

First, server 400 determines whether the old data contains data on WLAN access points for which data is present in the newly collected fingerprints. (action 600)

Actions 601 to 603 are carried out separately for each access point for which data is present in the old data and for which data is present in the newly collected fingerprints.

Server 400 determines whether the location of an access point was reliably estimated in action 505 based on newly collected fingerprints. (action 601) It is to be understood that if in certain embodiment, a quality list is not assembled at all, or if the actions of FIG. 5 are carried out in a different order, server 400 may also estimate the location of this access point and the reliability of the estimate in action 601. The criterion for a reliable estimation may be for instance that there is at least a predetermined number of fingerprints with RSS values exceeding a predetermined threshold, for instance −40 dBm, for the access node in question. Only if the received signal strength is sufficiently high, it may be possible to reliably estimate the location of the access point. Alternatively or in addition, the uncertainty of the location determined in action 505 could be used as a basis for determining whether the estimated location is reliable.

If the estimated location is reliable, server 400 determines the distance between the location that was estimated based on the new fingerprints and a location that was estimated based on previously received fingerprints. (action 602) A location that was estimated based on previously received fingerprints may belong to parameter values of stored parametric radio model data and thus be readily available. Alternatively, the location can be estimated based on previously stored fingerprint data or on measurement results that have previously been mapped to grid points of a grid and stored as grid data.

If the determined distance exceeds at least one predetermined threshold or set of thresholds, server 400 marks the access point as being suspicious for changed location. (action 603) A predetermined set of thresholds could be set for example to 5 meters in horizontal direction and one floor in vertical direction. It is to be understood that any other thresholds could be selected as well.

In addition, actions 611 to 613 are carried out for all access points for which data is present in the old data, but for which no data is present in the newly collected fingerprints.

Server 400 determines at first the coverage of the currently obtained fingerprints. (action 611) Fingerprint coverage can be assembled in the form of a binary grid, with a grid step equal to, for example, 3 meters, and possible grid values of 0 and 1. A value of '1' is assigned to a grid point, if at last one fingerprint has been generated in the neighborhood of the grid point. Otherwise, a value of '0' is assigned to the grid point.

Sever 400 then determines the effective coverage of each WLAN access point for which data is present in the old data but not in the currently collected fingerprints. (action 612) The effective coverage can be the area where the access point was determined to have an RSS value exceeding a threshold or where the access point is expected to have an RSS value exceeding a threshold based on a parametric radio model. The threshold may be set for example to −70 dBm, but any other value could be selected as well.

If the coverage areas intersect for an access point, server 400 marks the access point as being suspicious for being removed. (action 613)

Server 400 now assembles a list of all access points that have been marked as being suspicious either in action 603 or in action 613. (action 621) The reason for the marking may or may not be indicated in the list. Sever 400 transmits the list to all mobile devices 411, 412 that are currently used for surveying the localization site. It is to be understood that it would also be possible to assemble a first list for the access points that have been marked as suspicious for changed location and a second list for the access points that have been marked as suspicious for being removed.

The lists are received by mobile devices 411, 412 as a result of the up-to-date check. (action 516) Each mobile device 411, 412 presents the results to a user on a display of mobile device 411, 412 and requests a confirmation from the user that an access point that is indicated to be suspicious can be assumed to have been removed or relocated. The user input is transmitted back to server 400.

Server 400 receives the response and updates the old data accordingly. (action 622) That is, previously stored data for an access point is removed, if the responses from a predetermined minimum of mobile devices 411, 412, for example three, confirm that a suspicious access point has been removed or relocated. It is to be understood that any other number of devices may be selected as well.

Finally, server 400 supplements the previously stored updated data with newly determined data and the data is stored as positioning assistance data, e.g. in memory 403 or in an external memory. (action 508) The data that is eventually stored may be in various forms. The data that is stored may comprise new and old fingerprints data. Alternatively or in addition, it may comprise grid data, where old and new measurements are mapped together to grid points of at least one grid. This may have the effect that less data has to be stored and that an evaluation of the data may require less processing time than an evaluation of the original fingerprint data. Moreover, such grid data may be easy to supplement. Alternatively or in addition, the data that is stored as positioning assistance data may comprise parameter values of parametric radio models for each access point. Such parameter values require particularly little storage space, and little bandwidth if they are to be provided as positioning assistance data to mobile devices. Furthermore, parametric radio models may be suited to provide an estimate for an expected radio signal strength at locations from which fingerprints may still be missing.

The synchronization process for the localization site may be released. Next time when a new survey of the localization site starts, a new instance of the synchronization process may be initialized with previously collected, generated and determined data, and information about coverage, sufficiency and validity of the data that has been collected so far can be sent to all mobile devices 411, 412 that are used for the new survey in the beginning of the collection process, that is, in action 501.

Before releasing the synchronization process, collecting agents may be able to report the final status of data collection and quality assurance at this point to server 400. (action 517) That is, they can indicate a level of radio survey completeness, for example whether data collection is completed, not completed (and they plan to collect more soon), or incomplete, but they do not plan to collect more, etc. This input can be requested from a user of a mobile device 411, 412 automatically, e.g. when the user closes an application implementing the synchronization process, and the input can be sent automatically to server 400. This information can then be used by server 400 in action 508 when it is decided whether to generate final positioning assistance data (e.g. a final radio map) or not for the localization site.

Server 400 or some other server provides all or some of the stored positioning assistance data for the particular localization site to mobile devices upon request. These mobile devices may then determine their position using the positioning assistance data and radio measurements on WLAN access points at their current position.

It is to be understood that the presented example systems as well as the presented example operations may be varied in many ways. The operations may be varied for instance by modifying actions, by omitting actions and/or by adding actions. In addition, the order of actions could be modified.

For example, all lists generated by server 400 may be transmitted together in a single message to mobile devices 411, 412.

For example, further criteria may be considered for determining whether certain areas have to be visited again for a collection of data.

For example, in an alternative embodiment, the fingerprints could include results on measurements on signals of other non-cellular terrestrial communication nodes instead of or in addition to WLAN access point signals.

Summarized, certain embodiments of the invention allow providing each user collecting fingerprints at a particular site with information about data that has been collected by other users to ensure that the data as a whole is neither insufficient nor redundant. Thereby, certain embodiment may enable an efficient and interactive process of data harvesting in the case that the data collection is carried out with multiple collecting devices. Certain embodiment may allow providing constant 'on-line' feedback about coverage, quality and validity of combined data collected by multiple users at different times, for example different days or months.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 7:
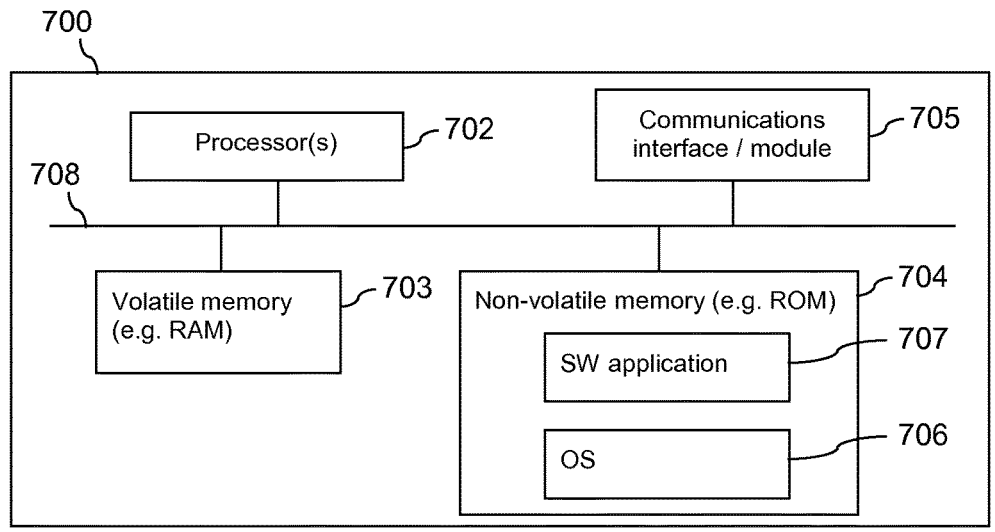
FIG. 7 is a schematic block diagram of an example embodiment of an apparatus.
Figure 8:
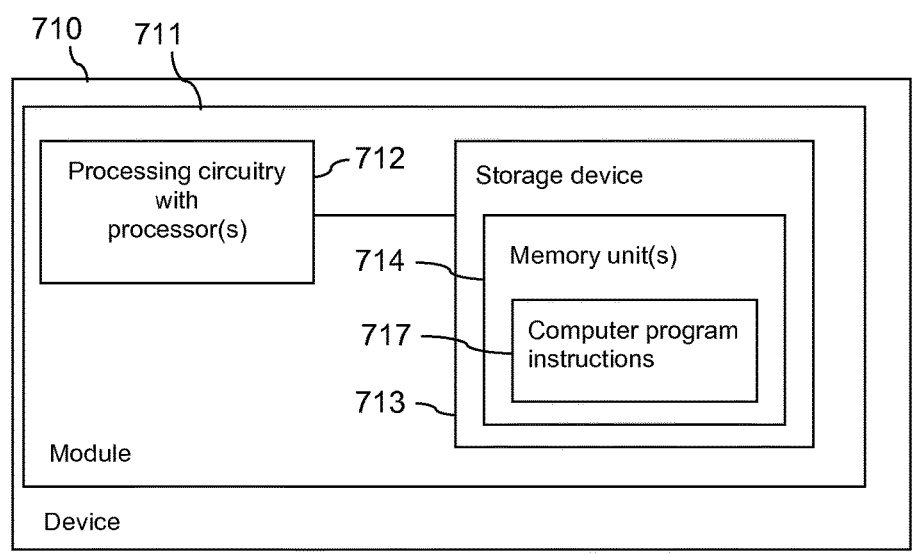
FIG. 8 is a schematic block diagram of an example embodiment of an apparatus.

Example embodiments using at least one processor and at least one memory as a non-transitory data medium are shown in FIGS. 7 and 8.

FIG. 7 is a schematic block diagram of a device 700. Device 700 includes a processor 702. Processor 702 is connected to a volatile memory 703, such as a RAM, by a bus 708. Bus 708 also connects processor 702 and RAM 703 to a non-volatile memory 704, such as a ROM. A communications interface or module 705 is coupled to bus 708, and thus also to processor 702 and memories 703, 704. Within ROM 704 is stored a software (SW) application 707. Software application 707 may be a positioning application, although it may take some other form as well. An operating system (OS) 706 also is stored in ROM 704.

FIG. 8 is a schematic block diagram of a device 710. Device 710 may take any suitable form. Generally speaking, device 710 may comprise processing circuitry 712, including one or more processors, and a storage device 713 comprising a single memory unit or a plurality of memory units 714. Storage device 713 may store computer program instructions 717 that, when loaded into processing circuitry 712, control the operation of device 710. Generally speaking, also a module 711 of device 710 may comprise processing circuitry 712, including one or more processors, and storage device 713 comprising a single memory unit or a plurality of memory units 714. Storage device 713 may store computer program instructions 717 that, when loaded into processing circuitry 712, control the operation of module 711.

The software application 707 of FIG. 7 and the computer program instructions 717 of FIG. 8, respectively, may correspond e.g. to the computer program code in any of memories 102, 302 or 402, respectively.

Figure 9:
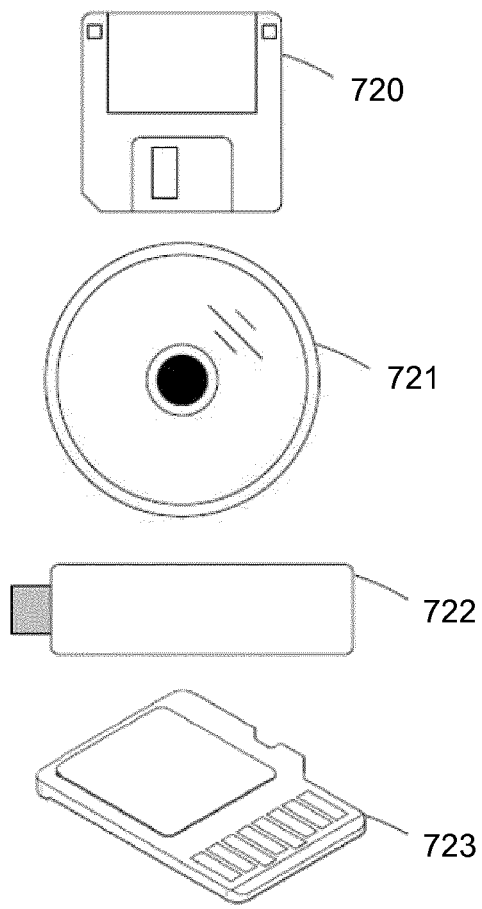
FIG. 9 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 9, which presents, from top to bottom, schematic diagrams of a magnetic disc storage 720, of an optical disc storage 721, of a semiconductor memory circuit device storage 722 and of a Micro-SD semiconductor memory card storage 723.

The functions illustrated by processor 101 in combination with memory 102, or CPU 301 in combination with program memory 302, or processor 401 in combination with memory 402, or component 404 can also be viewed as means for obtaining fingerprints that have been collected by a plurality of mobile devices at a particular site for supporting a positioning of other mobile devices, each fingerprint comprising results of measurements on radio signals of at least one communication node at a particular location and an indication of the particular location; means for generating feedback information based on the obtained fingerprints as a whole for coordinating a collection of fingerprints by the plurality of mobile devices; and means for transmitting the feedback information to the plurality of mobile devices for presentation to users of the mobile devices.

The program codes in memories 102, 302 and 402 can also be viewed as comprising such means in the form of functional modules.

Figure 6:
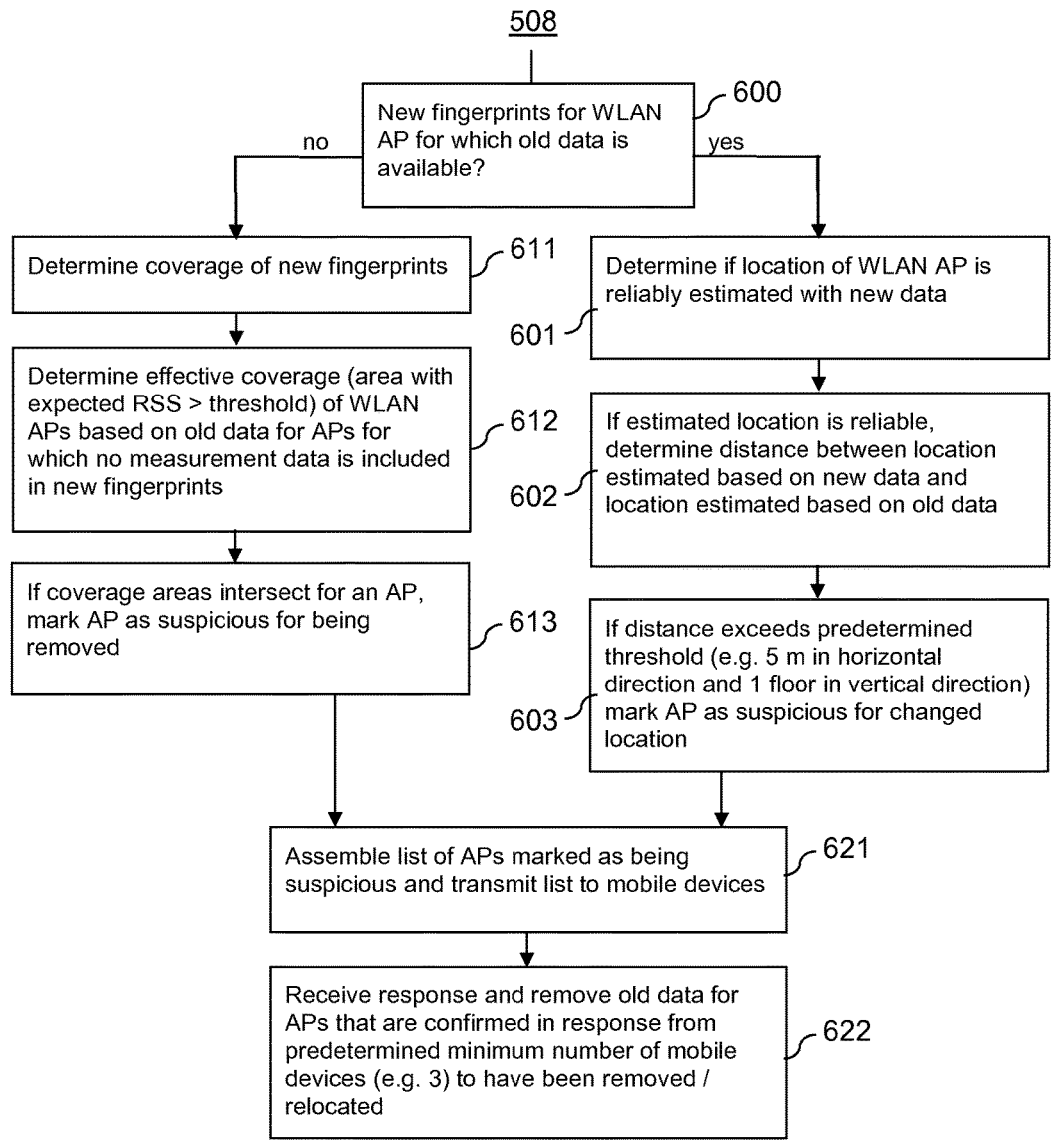
FIG. 6 is a flow chart illustrating a detail of the operations of FIG. 5.

FIGS. 2, 5 and 6 may also be understood to represent example functional blocks of computer program codes supporting positioning quality assurance.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method comprising, performed by at least one apparatus:
   obtaining fingerprints that have been collected by a plurality of mobile devices at a particular site for supporting a positioning of other mobile devices, each fingerprint comprising results of measurements on radio signals of at least one communication node at a particular location and an indication of the particular location;
   generating feedback information based on the obtained fingerprints as a whole for coordinating a collection of fingerprints by the plurality of mobile devices, wherein the feedback information relates to a coverage of the obtained fingerprints collected from the plurality of mobile devices; and
   transmitting the feedback information to the plurality of mobile devices for presentation to users of the mobile devices.

2. The method according to claim 1, wherein generating feedback information comprises assembling a list of locations for which measurements have been provided in the fingerprints, for coordinating the collection of fingerprints by the plurality of mobile devices.

3. The method according to claim 1, wherein the feedback information relates to a quality of radio model data, the method further comprising at least one of:
   generating radio model data for a radio model for each of a plurality of communication nodes based on the obtained fingerprints, the radio model data for each radio model comprising an estimated location of a communication node, and determining a quality of each of the radio models, wherein generating feedback information comprises assembling a list including for each of the communication nodes the estimated location of the communication node and an indication of a quality of the radio model; and/or
   generating radio model data for a radio model for each of a plurality of communication nodes based on the obtained fingerprints, the radio model data for each radio model comprising an estimated location of a communication node, determining a quality of each of the radio models, and computing a proportion of radio models with associated indication of high quality to all radio models wherein generating feedback information comprises providing an indication of the computed proportion; and/or
   assigning for communication nodes, for which measurement results are included in the obtained fingerprints, signal strength related values to areas of at least one grid representing the particular site, determining for each assigned signal strength related value an uncertainty value, and determining areas for which a ratio of a number of signal strength values assigned to a respective area with an uncertainty value falling short of a predetermined threshold to one of a number of all signal strength values assigned to the respective area and a number of communication nodes from which signals are expected to be detected in an area of the site corresponding to the respective area falls short of a predetermined threshold, wherein generating feedback information comprises assembling a list including an indication of the determined areas as areas with poor radio model data quality; and/or
   assigning for communication nodes, for which measurement results are included in the obtained fingerprints, signal strength related values to areas of at least one grid representing the particular site, determining for each assigned signal strength related value an uncertainty value, determining areas for which a ratio of a number of signal strength values assigned to a respective area with an uncertainty value falling short of a predetermined threshold to one of a number of all signal strength values assigned to the respective area and a number of communication nodes from which signals are expected to be detected in an area of the site corresponding to the respective area falls short of a predetermined threshold as areas with poor radio model data quality, and computing a proportion of areas with poor radio model data quality to all areas of the at least one grid, wherein generating feedback information comprises providing an indication of the computed proportion; and/or
   assigning for communication nodes, for which measurement results are included in the obtained fingerprints, signal strength related values to grid points of at least one grid representing the particular site, determining for each assigned signal strength related value an uncertainty value, determining grid points for which a ratio of a number of signal strength values assigned to a respective grid point with an uncertainty value falling short of a predetermined threshold to one of a number of all signal strength values assigned to the respective grid point and a number of communication nodes from which signals are expected to be detected in an area of the site corresponding to the respective grid point falls short of a predetermined threshold, wherein generating feedback information comprises assembling a list including an indication of the determined grid points as grid points with poor radio model data quality; and/or
   assigning for communication nodes, for which measurement results are included in the obtained fingerprints, signal strength related values to grid points of at least one grid representing the particular site, determining for each assigned signal strength related value an uncertainty value, determining grid points for which a ratio of a number of signal strength values assigned to a respective grid point with an uncertainty value falling short of a predetermined threshold to one of a number of all signal strength values assigned to the respective grid point and a number of communication nodes from which signals are expected to be detected in an area of the site corresponding to the respective grid point falls short of a predetermined threshold as grid points with poor radio model data quality, and computing a proportion of grid points having poor quality to all grid points of the at least one grid, wherein generating feedback information comprises providing an indication of the computed proportion.

4. The method according to claim 3, further comprising receiving, by a particular mobile device, feedback information, and at least one of:
   if the feedback information includes a list of estimated locations of communication nodes and an associated indication of a quality of a radio model, presenting, by the particular mobile device, a map with an indication of the estimated locations and the associated quality of a radio model to a user; and/or
   if the feedback information includes a list of estimated locations of communication nodes and an associated indication of a quality of a radio model, computing, by the particular mobile device, a proportion of radio models with associated indication of high quality to all radio models and presenting an indication of the proportion to a user as indicator of data sufficiency; and/or if the feedback information includes a list including at least an indication of areas with poor radio model data quality, presenting, by the particular mobile device, a map with at least an indication of the areas with poor radio model data quality; and/or if the feedback information includes a list including at least an indication of areas with poor radio model data quality, computing, by the particular mobile device, a proportion of areas with poor radio model data quality to all areas of the at least one grid and presenting an indication of the proportion to a user as indicator of data sufficiency; and/or if the feedback information includes a list including at least an indication of grid points with poor radio model data quality, presenting, by the particular mobile device, a map with at least an indication of the grid points having poor quality; and/or if the feedback information includes a list including at least an indication of grid points with poor radio model data quality, computing, by the particular mobile device, a proportion of grid points with poor radio model data quality to all grid points of the at least one grid and presenting an indication of the proportion to a user as indicator of data sufficiency.

5. The method according to claim 1, wherein the feedback information relates to a validity of the obtained fingerprints, the method further comprising comparing measurement results in different fingerprints that have been obtained for a comparable location and marking fingerprints including different measurement results for a comparable location as suspicious, and wherein generating feedback information comprises assembling a list of fingerprints that have been marked to be suspicious.

6. The method according to claim 5, further comprising
receiving, by a particular mobile device, feedback information that includes a list of fingerprints that have been marked to be suspicious;
filtering, by the particular mobile device, fingerprints that have been collected by the particular device;
presenting, by the particular mobile device, the list to a user;
requesting, by the particular mobile device, an input from the user whether the fingerprint should be considered correct or incorrect; and
transmitting, by the particular mobile device, a corresponding indication to the apparatus.

7. The method according to claim 1, wherein the obtained fingerprints are currently obtained fingerprints, wherein the feedback information relates to a relevance of data that has been generated and stored based on previously obtained fingerprints, the method further comprising at least one of:
estimating a location of a communication node based on the currently obtained fingerprints, determining a distance between the estimated location and a location that has been estimated for the communication node based on the previously obtained fingerprints, and deciding on whether to mark the communication node as suspicions for changed location based on the determined distance, wherein generating feedback information comprises assembling a list of communication nodes that have been marked to be suspicious for changed location; and/or determining whether a coverage of currently obtained fingerprints intersects with a coverage of a communication node that is based on previously obtained fingerprints, while currently obtained fingerprints do not comprise measurement results on signals transmitted by the communication node, and, if this is the case, marking the communication node as suspicious for being removed, wherein generating feedback information comprises assembling a list of communication nodes that have been marked to be suspicious for being removed.

8. The method according to claim 7, further comprising
receiving, by a particular mobile device, feedback information that includes a list of communication nodes that have been marked to be suspicious for one of change of location and being removed;
presenting, by the particular mobile device, the list to a user of the particular mobile device;
requesting, by the particular mobile device, an input from the user whether data on the marked communication node that was generated from previously obtained fingerprints should be removed; and
transmitting, by the particular mobile device, a corresponding indication to the apparatus.

9. The method according to claim 1, further comprising at least one of:
receiving, by the at least one apparatus, from at least one of the plurality of mobile devices an indication on a state of completion of a collection of fingerprints at the particular site; and/or
receiving, by the at least one apparatus, from at least one of the plurality of mobile devices an indication on a state of completion of a collection of fingerprints at the particular site and deciding in response to the indication whether to generate positioning assistance data for supporting a positioning of mobile devices at the particular site; and/or
requesting, by at least one of the plurality of mobile devices, a user of the at least one of the plurality of mobile devices to input an indication of a state of completion of a collection of fingerprints at the particular site; and/or
requesting, by at least one of the plurality of mobile devices, a user of the at least one of the plurality of mobile devices to input an indication of a state of completion of a collection of fingerprints at the particular site, and transmitting the indication to the at least one apparatus.

10. The method according to claim 1, wherein the at least one communication node comprises at least one of:
at least one cellular transmitter; and/or
at least one terrestrial non-cellular transmitter; and/or
at least one access point of at least one wireless local area network; and/or
at least one Bluetooth transmitter; and/or
at least one Bluetooth low energy transmitter; and
wherein the at least one apparatus is or belongs to one of:
a mobile device; or
a server.

11. An apparatus comprising at least one processor and at least one memory including computer program code, the at least one memory and the computer program code configured to, with the at least one processor, cause the apparatus at least to perform:
obtain fingerprints that have been collected by a plurality of mobile devices at a particular site for supporting a positioning of other mobile devices, each fingerprint comprising results of measurements on radio signals of at least one communication node at a particular location and an indication of the particular location;

generate feedback information based on the obtained fingerprints as a whole for coordinating a collection of fingerprints by the plurality of mobile devices, wherein the feedback information relates to a coverage of the obtained fingerprints collected from the plurality of mobile devices; and transmit the feedback information to the plurality of mobile devices for presentation to users of the mobile devices.

12. The apparatus according to claim 11, wherein generating feedback information comprises assembling a list of locations for which measurements have been provided in the fingerprints, for coordinating the collection of fingerprints by the plurality of mobile devices.

13. The apparatus according to claim 11, wherein the feedback information relates to a quality of radio model data, and wherein the at least one memory and the computer program code are further configured to, with the at least one processor, cause the apparatus to at least one of:

generate radio model data for a radio model for each of a plurality of communication nodes based on the obtained fingerprints, the radio model data for each radio model comprising an estimated location of a communication node, and determining a quality of each of the radio models, wherein generating feedback information comprises assembling a list including for each of the communication nodes the estimated location of the communication node and an indication of a quality of the radio model; and/or generate radio model data for a radio model for each of a plurality of communication nodes based on the obtained fingerprints, the radio model data for each radio model comprising an estimated location of a communication node, determine a quality of each of the radio models, and compute a proportion of radio models with associated indication of high quality to all radio models, wherein generating feedback information comprises providing an indication of the computed proportion; and/or assign for communication nodes, for which measurement results are included in the obtained fingerprints, signal strength related values to areas of at least one grid representing the particular site, determine for each assigned signal strength related value an uncertainty value, and determine areas for which a ratio of a number of signal strength values assigned to a respective area with an uncertainty value falling short of a predetermined threshold to one of a number of all signal strength values assigned to the respective area and a number of communication nodes from which signals are expected to be detected in an area of the site corresponding to the respective area falls short of a predetermined threshold, wherein generating feedback information comprises assembling a list including an indication of the determined areas as areas with poor radio model data quality; and/or assign for communication nodes, for which measurement results are included in the obtained fingerprints, signal strength related values to areas of at least one grid representing the particular site, determine for each assigned signal strength related value an uncertainty value, determine areas for which a ratio of a number of signal strength values assigned to a respective area with an uncertainty value falling short of a predetermined threshold to one of a number of all signal strength values assigned to the respective area and a number of communication nodes from which signals are expected to be detected in an area of the site corresponding to the respective area falls short of a predetermined threshold as areas with poor radio model data quality, and compute a proportion of areas with poor radio model data quality to all areas of the at least one grid, wherein generating feedback information comprises providing an indication of the computed proportion; and/or assign for communication nodes, for which measurement results are included in the obtained fingerprints, signal strength related values to grid points of at least one grid representing the particular site, determine for each assigned signal strength related value an uncertainty value, determine grid points for which a ratio of a number of signal strength values assigned to a respective grid point with an uncertainty value falling short of a predetermined threshold to one of a number of all signal strength values assigned to the respective grid point and a number of communication nodes from which signals are expected to be detected in an area of the site corresponding to the respective grid point falls short of a predetermined threshold, wherein generating feedback information comprises assembling a list including an indication of the determined grid points as grid points with poor radio model data quality; and/or assign for communication nodes, for which measurement results are included in the obtained fingerprints, signal strength related values to grid points of at least one grid representing the particular site, determine for each assigned signal strength related value an uncertainty value, determine grid points for which a ratio of a number of signal strength values assigned to a respective grid point with an uncertainty value falling short of a predetermined threshold to one of a number of all signal strength values assigned to the respective grid point and a number of communication nodes from which signals are expected to be detected in an area of the site corresponding to the respective grid point falls short of a predetermined threshold as grid points with poor radio model data quality, and compute a proportion of grid points having poor quality to all grid points of the at least one grid, wherein generating feedback information comprises providing an indication of the computed proportion.

14. The apparatus according to claim 13, wherein the apparatus is one of the plurality of mobile devices, and wherein the at least one memory and the computer program code are further configured to, with the at least one processor, cause the apparatus to at least one of:

if the feedback information includes a list of estimated locations of communication nodes and an associated indication of a quality of a radio model, present a map with an indication of the estimated locations and the associated quality of a radio model to a user; and/or if the feedback information includes a list of estimated locations of communication nodes and an associated indication of a quality of a radio model, compute a proportion of radio models with associated indication of high quality to all radio models and presenting an indication of the proportion to a user as indicator of data sufficiency; and/or if the feedback information includes a list including at least an indication of areas with poor radio model data quality, present a map with at least an indication of the areas with poor radio model data quality; and/or if the feedback information includes a list including at least an indication of areas with poor radio model data quality, compute a proportion of areas with poor radio model data quality to all areas of the at least one grid and present an indication of the proportion to a user as indicator of data sufficiency; and/or if the feedback information includes a list including at least an indication of grid points with poor radio model data quality, present a map with at least an indication of the grid points having poor quality; and/or if the feedback information includes a list including at least an indication of grid points with poor radio model data quality, compute a proportion of grid points with poor radio model data quality to all grid points of the at least one grid and present an indication of the proportion to a user as indicator of data sufficiency.

15. The apparatus according to claim 11, wherein the feedback information relates to a validity of the obtained fingerprints, wherein the at least one memory and the computer program code are further configured to, with the at least one processor, cause the apparatus to compare measurement results in different fingerprints that have been obtained for a comparable location, and to mark fingerprints including different measurement results for a comparable location as suspicious, and wherein generating feedback information comprises assembling a list of fingerprints that have been marked to be suspicious.

16. The apparatus according to claim 15, wherein the apparatus is one of the plurality of mobile devices, and wherein the at least one memory and the computer program code are further configured to, with the at least one processor, cause the apparatus to:
filter fingerprints that have been collected by the apparatus from feedback information that includes a list of fingerprints that have been marked to be suspicious;
present the list to a user; and
request an input from the user whether the fingerprint should be considered correct or incorrect.

17. The apparatus according to claim 11, wherein the obtained fingerprints are currently obtained fingerprints, wherein the feedback information relates to a relevance of data that has been generated and stored based on previously obtained fingerprints, and wherein the at least one memory and the computer program code are further configured to, with the at least one processor, cause the apparatus to at least one of:
estimate a location of a communication node based on the currently obtained fingerprints, determine a distance between the estimated location and a location that has been estimated for the communication node based on the previously obtained fingerprints, and decide on whether to mark the communication node as suspicions for changed location based on the determined distance, wherein generating feedback information comprises assembling a list of communication nodes that have been marked to be suspicious for changed location; and/or
determine whether a coverage of currently obtained fingerprints intersects with a coverage of a communication node that is based on previously obtained fingerprints, while currently obtained fingerprints do not comprise measurement results on signals transmitted by the communication node, and, if this is the case, mark the communication node as suspicious for being removed, wherein generating feedback information comprises assembling a list of communication nodes that have been marked to be suspicious for being removed.

18. The apparatus according to claim 17, wherein the apparatus is one of the plurality of mobile devices, and wherein the at least one memory and the computer program code are further configured to, with the at least one processor, cause the apparatus to:
present a list of communication nodes that have been marked to be suspicious for one of changed location and being removed to a user; and
request an input from the user whether data on the marked communication node that was generated from previously obtained fingerprints should be removed.

19. The apparatus according to claim 11, wherein the at least one memory and the computer program code are further configured to, with the at least one processor, cause the apparatus to at least one of:
receive from at least one of the plurality of mobile devices an indication on a state of completion of a collection of fingerprints at the particular site; and/or
receive from at least one of the plurality of mobile devices an indication on a state of completion of a collection of fingerprints at the particular site and decide in response to the indication whether to generate positioning assistance data for supporting a positioning of mobile devices at the particular site; and/or
request, in case the apparatus is one of the plurality of mobile devices, a user to input an indication of a state of completion of a collection of fingerprints at the particular site.

20. The apparatus according to claim 11, wherein the at least one communication node comprises at least one of:
at least one cellular transmitter; and/or
at least one terrestrial non-cellular transmitter; and/or
at least one access point of at least one wireless local area network; and/or
at least one Bluetooth transmitter; and/or
at least one Bluetooth low energy transmitter.

21. The apparatus according to claim 11, wherein the apparatus is one of:
a chip;
a module for a server;
a server;
a module for a mobile device; and
a mobile device.

22. A non-transitory computer readable storage medium in which computer program code is stored, the computer program code causing an apparatus to perform the following when executed by a processor:
obtain fingerprints that have been collected by a plurality of mobile devices at a particular site for supporting a positioning of other mobile devices, each fingerprint comprising results of measurements on radio signals of at least one communication node at a particular location and an indication of the particular location;
generate feedback information based on the obtained fingerprints as a whole for coordinating a collection of fingerprints by the plurality of mobile devices, wherein the feedback information relates to a coverage of the obtained fingerprints collected from the plurality of mobile devices; and
transmit the feedback information to the plurality of mobile devices for presentation to users of the mobile devices.

* * * * *